Aug. 4, 1953
A. P. HAYES
2,647,703
REEL FOR LEASHES
Filed Aug. 17, 1950
2 Sheets-Sheet 1
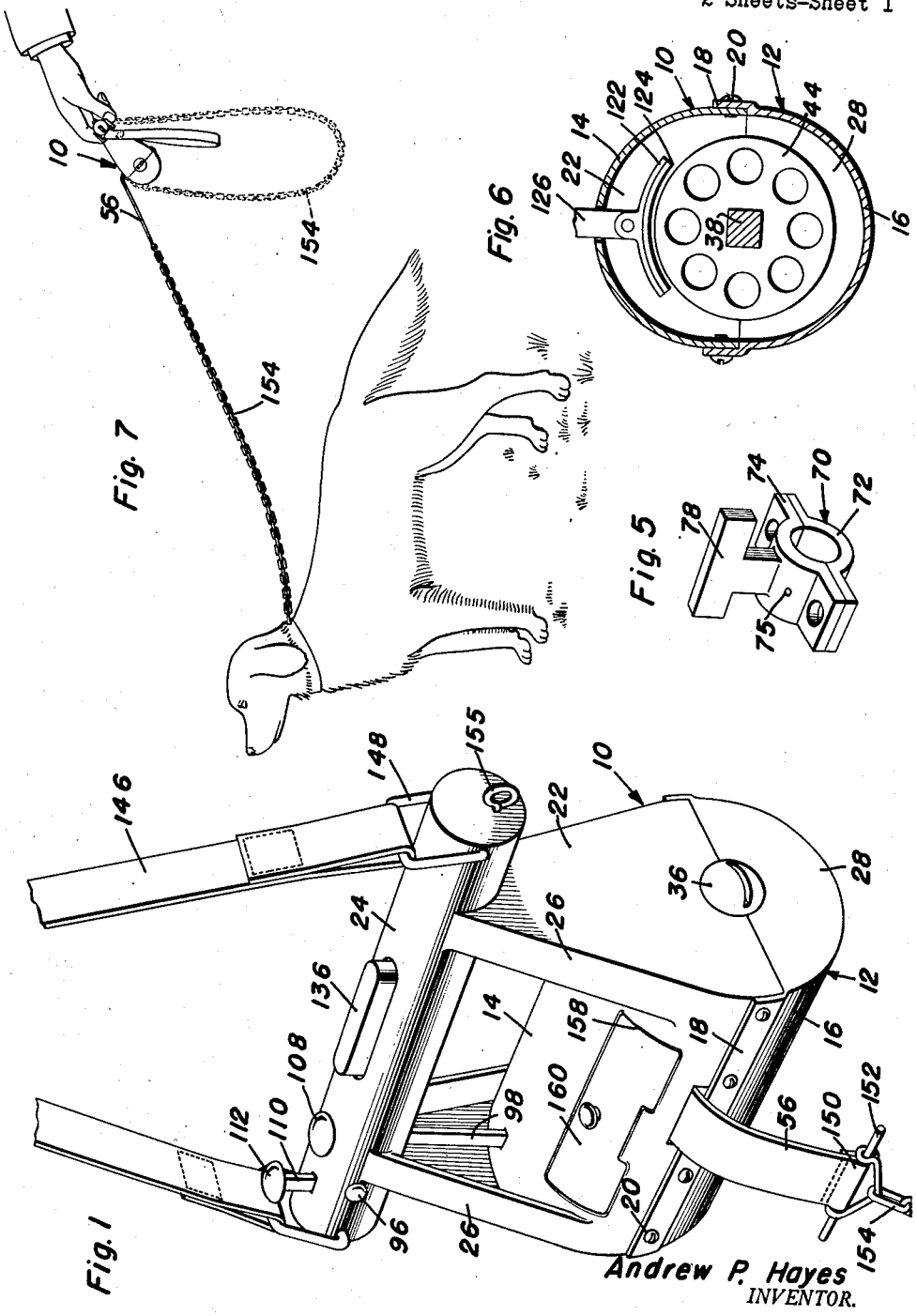
Andrew P. Hayes
INVENTOR.
BY Aug. 4, 1953
A. P. HAYES
2,647,703
REEL FOR LEASHES
Filed Aug. 17, 1950
2 Sheets-Sheet 2
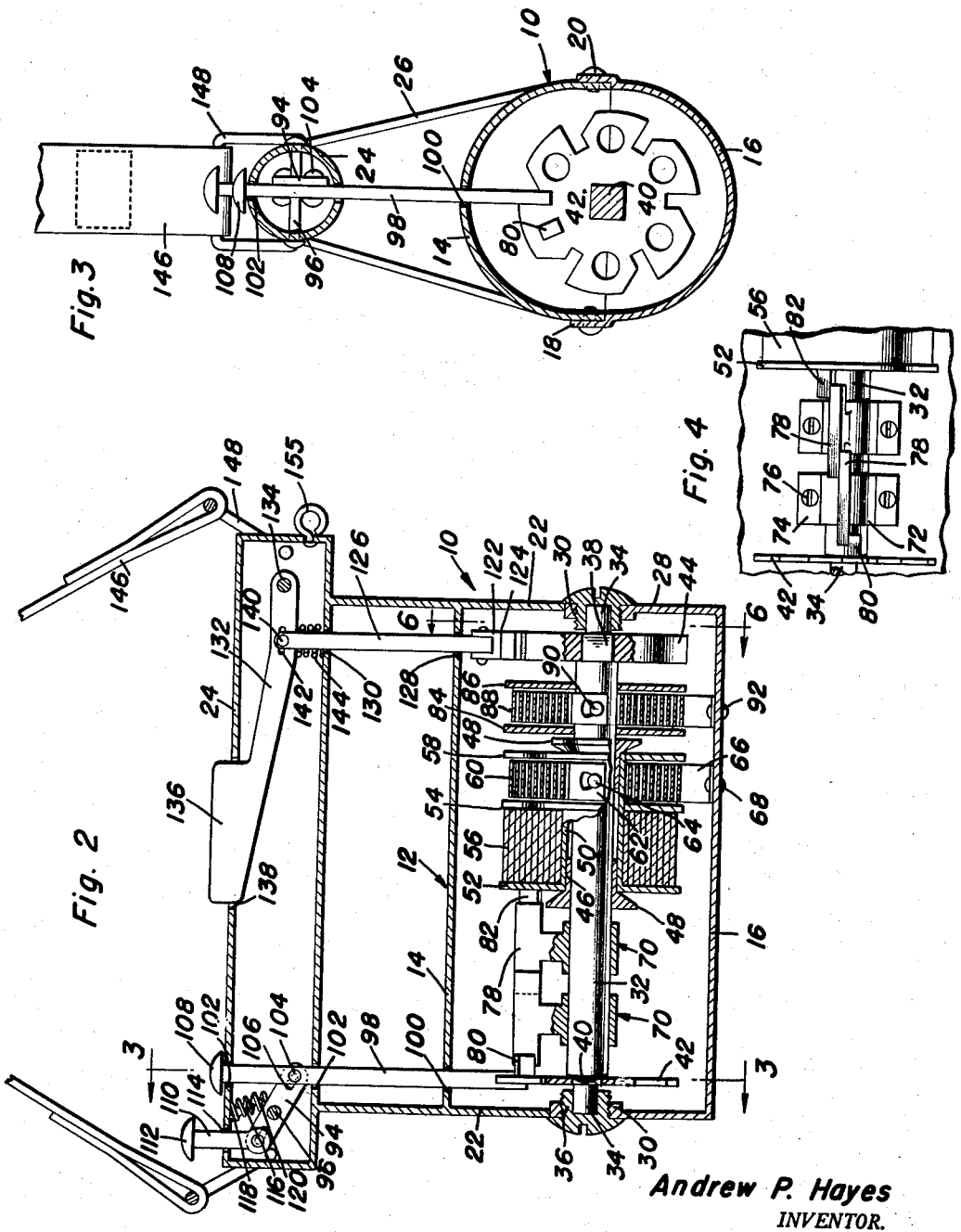
Andrew P. Hayes
INVENTOR.

Patented Aug. 4, 1953

2,647,703

UNITED STATES PATENT OFFICE 2,647,703

REEL FOR LEASHES

Andrew P. Hayes, San Francisco, Calif.

Application August 17, 1950, Serial No. 180,068

9 Claims. (Cl. 242—107)

This invention comprises novel and useful improvements in reels and more particularly pertains to a reel for dog leashes.

An important object of this invention is to provide a reel in which the leash may be selectively locked against withdrawal of the leash from the reel, and which reel will nevertheless rewind the excess line, in the event the leash becomes slack.

Another important object of this invention is to provide a reel, in accordance with the foregoing object, in which the rate of withdrawal and rewinding of the leash on the reel may be selectively varied.

Yet another object of this invention is to provide a reel, in accordance with the foregoing objects, which reel is compact and of simple construction, and which will generally facilitate the leading of dogs on a leash.

An important feature of this invention resides in the provision of a reel, the leash disposed on the reel, and spring means yieldingly urging the reel in a direction to wind the leash thereon, a brake arm, and a unidirectional brake for selectively locking the arm to the reel to selectively prevent unwinding of the leash from the reel, and which will yet permit rewinding of the leash on the reel when the tension on the line becomes slack.

Still another feature of this invention resides in the provision of a reel, in accordance with the foregoing features, in which the shaft is rotatably journaled in a housing with a handle member carried by the housing, and with means for selectively locking the shaft against rotation being carried by the handle member.

These, together with various ancillary objects and features, are attained by this device, a preferred embodiment of which has been illustrated by way of example only in the accompanying drawings, wherein:

Figure 1 is a perspective elevational view of the reel;

Figure 2 is a longitudinal sectional view of the reel;

Figure 3 is a transverse sectional view of the reel, taken substantially on the plane 3—3 of Figure 2;

Figure 4 is a fragmentary detail view of the unidirectional brake for the reel;

Figure 5 is a perspective elevational view of one of the dogs which constitute a part of the brake;

Figure 6 is a fragmentary transverse sectional view, taken substantially on the plane 6—6 of Figure 2; and Figure 7 is a diagrammatical sketch illustrating the use of the device with a dog.

In the leading of dogs, it is a desideratum to maintain a taut leash so that the leash will not become tangled around posts, and the like, or become worn from dragging on the ground, it also being a desideratum to be able to arrest the leash against withdrawal from the reel so that the effective lengths of the leash may be varied, as may be desired. There has accordingly been provided a reel in which the reel may be locked against withdrawal of the leash therefrom after any predetermined amount of leash has been withdrawn from the reel, and which reel will, nevertheless, rewind the leash on the reel should the leash become slack, to thereby maintain a taut leash.

Reference is now made more specifically to the accompanying drawings, wherein like numerals designate similar parts throughout the various views, and in which the reel is indicated generally by the numeral 10.

The reel 10 includes a substantially cylindrical housing 12 which includes the semi-cylindrical upper portion 14 and a complementary semi-cylindrical lower portion 16, one of the portions, such as the lower portion 16, being provided with off-set longitudinally extending flanges 18 which are adapted to overlie the upper portion 14, whereby the upper and lower portions 14 and 16 of the housing 12 may be secured together, as by fasteners 20. The side walls 22 of the upper portion 14 of the housing 12 extend above the housing and are connected to a substantially cylindrical handle-forming member 24, suitable reinforcing flanges 26 being formed integrally with the end wall 22, and being terminally secured to the handle-forming member 24 and to the upper portion 14 of the housing.

The end walls 28 of the lower portion 16 of the housing 12 have an internally threaded sleeve 30 secured thereto, and extending concentric with the cylindrical housing 12, for reasons which will later become apparent as the following description proceeds.

A shaft 32 is rotatably journaled axially of the housing 12, the shaft having longitudinally extending trunnions 34 thereon which are rotatably journaled in the externally threaded bearing members 36, which bearing members are adapted to be detachably secured in the sleeve 30. The shaft 32 is provided with splined portions 38 and 40 adjacent opposite ends thereof, whereby a toothed disk 42, and a brake drum 44 are respectively non-rotatably attached to the shaft 32, for rotation therewith.

A pair of bushings 46 having tapered flanges 48 are attached to the shaft 32 intermediate the ends thereof, a sleeve 50 being rotatably journaled on the bushings 46. A pair of radially extending flanges 52 and 54 are carried by the sleeve 50 and define a spool for receiving the leash 56, a third flange 58 being disposed parallel to the flange 54 to guidingly retain a coil spring 60 therebetween. The spring 60 has the inner end 62 thereof secured to the sleeve 50, as by a fastener 64, the outer end 66 of the spring 60 being secured to the housing 12, as by the fastener 68. As is thought obvious, the inner end of the leash 56 is also secured to the sleeve 50. It will thus be appreciated that when the leash 56 is withdrawn from the sleeve 50, the spring 60 will yieldingly resist such a withdrawal, and when the leash is allowed to become slack, the spring 60 will cause the leash to rewind upon the sleeve 50.

In order to selectively lock the sleeve 50 against rotation in a direction which will permit unwinding of the leash from the sleeve, there are provided one or more dogs 70, each of which includes a split sleeve portion 72, which carry laterally extending flanges 74 whereby the halves of the sleeve may be detachably secured together, as by fasteners 76, and which sleeve portion is adapted to be rotatably journaled on the shaft 32. A radially extending T-shaped arm 78 is attached to one of the portions of the sleeve 72, the arm portion of the T extending parallel to the axis of the shaft 32. As is apparent, a radial lubricant bore 75 may be provided in the sleeve portions 72.

A locking arm 80 is carried by the toothed disk 42 and extends in the direction of the sleeve 50, an ear 82 being carried by the flange 52 which is adjacent to the toothed disk. It is intended that the sleeve 50, and the toothed disk 42, be spaced apart a distance such that the dog 70 will have portions thereof disposed in the path of movement of both the locking arm 80 and the ear 82. It is further intended that the arms of the adjacent dogs be disposed in the path of movement of each other, whereby rotation of either the disk 42 or the sleeve 50 and flange 52 will cause the ear 82, the dog 70 and the locking arm 80 to be disposed in overlapping engagement, substantially as shown in Figure 4 of the drawing. Since the number of revolutions of the sleeve 50 and the flange 52 which will be necessary to cause the dog 70, the locking arm 80 and the ear 82 to assume the position shown in Figure 4, is dependent upon the number of dogs utilized, it will be appreciated that a greater or lesser number of dogs may be utilized, depending upon the length of the leash 56, it being preferred that the number of revolutions necessary to cause the locking arm, the dogs and the ear 82 to become in overlapping engagement, when the flange 52 is rotated in one direction away from a position in which those members were in overlapping engagement, until they are again in overlapping engagement, be sufficient to entirely wind or unwind the leash from the reel. Obviously, the number of revolutions the flange 52 will turn relative to the locking arm 80, when the latter is locked against rotation, from one extreme position to the other, will be equal to the number of the dogs utilized plus one.

A pair of laterally spaced plates 84 and 86 are secured to the shaft 32 and are adapted to guidingly retain a coil spring member 88 therebetween, one end of which spring member is secured to the shaft 32, as by a fastener 90, the other end of which spring member is secured to the lower portion 16 of the housing 12, as by a fastener 92. It is intended that both the spring 60 and the spring 88 serve to respectively urge the sleeve 50 and the shaft 32 to respectively rotate in the same direction. It will thus be appreciated that the spring 88 will urge the toothed disk 42 and the brake arm 80 carried thereby into engagement with the dog 70, which in turn will be urged into engagement with the ear 82 carried by the flange 52. Since both the spring 88 and the spring 60 serve to respectively urge the shaft 32 and the sleeve 50 in the same direction, it will be appreciated that when the shaft 32 is locked against rotation, the sleeve 50 will also be locked against withdrawal of the leash 56 therefrom. It will be noted, however, that when the shaft is locked against rotation, the sleeve 50 may nevertheless rotate in a direction to wind the leash 56 thereon, the number of winding revolutions of the sleeve 50 being determined by the number of dogs 70, as was more fully discussed previously.

In order to selectively lock the shaft 32 against rotation, there is provided a rocker arm 94 which is pivotally attached by the shaft 96 to the cylindrical handle-forming member 24, a locking rod 98, which is slidably received in the bore 100 in the upper portion 14 of the housing 12 and which is also slidably received in the bores 102 in the handle member 24, has a pin 104 thereon which extends through the slot 106 in the rocker arm, whereby the rod 98 and the rocker arm 94 are pivotally attached to each other. The rod 98 is provided with a head portion 108 on the end thereof remote from the toothed disk 42, whereby the rod may be selectively reciprocated into engagement with one of the teeth on the disk 42. A release bar 110 having a head 112 is guidably received in a bore 114 in the handle member 24 and is pivotally connected to the other end of the rocker arm 94 whereby reciprocation of the bar 110 within the bore 114 will cause the rod 98 to be urged out of engagement with the toothed disk 42. A spring member 116 is disposed about the tabs 118 and 120 which are respectively carried by the inner side of the handle member 24 and the rocker arm 94, whereby the latter will be yieldingly retained in either off-center position.

Since it is also desirable to permit the rate of withdrawal and rewinding of the leash on the spool or sleeve 50 to be regulated, there has been provided a brake shoe 122 having a lining 124, which shoe is pivotally carried by a reciprocable actuator bar 126 guidably received in the bores 128 and 130 in the housing and handle-forming member 24 respectively. An arm 132 is pivotally attached to the handle-forming member 24 as by the shaft 134, which arm has a key-forming portion 136 extending through a slot 138 in the handle member 24. The actuator bar 126 is pivotally and slidably connected to the arm 132 by means of a pin 140 which extends through a slot 142 in the arm 132. A spring 144 is interposed between the arm 132 and the handle-forming member 24, to yieldingly urge the actuator bar into its inoperative position. Thus, as will be appreciated, either the brakeshoe 122 may be utilized to regulate the rate of winding or unwinding of the leash 56 on the spool or sleeve 50, or, alternatively, the shaft may be selectively locked against rotation by means of the rod 98.

For convenience in carrying, suitable shoulder straps or a hand strap 146 may be attached to opposite ends of the handle member 24, as by the shackles 148. Additionally the outer end of the leash 56 may be provided with a loop 150 which receives a pin 152 by means of which the lead chain 154 may be coupled to the leash. An eyelet 155 may be provided on the handle member 24 to support the free end of the lead chain 154 when the latter is not attached to a dog.

As is apparent from a consideration of Figure 1, the upper portion 14 of the housing is provided with a slot 156 through which the leash 56 extends, and may also be provided with an aperture 158 which is closed by the hinged cover member 160, whereby access may be had to the various parts of the reel for oiling the same.

In operation, the lead chain and the leash 56 are attached to the collar of a dog, the dog then being permitted to wander off and withdraw the leash from the sleeve 50. If it is desired to regulate the rate at which the leash is withdrawn from the sleeve, it is merely necessary to gently apply the brakeshoe 122 to the drum 44, by means of the arm 132, whereby rotation of the shaft 32 will be regulated. The shaft 32 will then prevent unwinding rotation of the sleeve 50, since the spring 88 urges the locking arm 80 and the dog 70 in overlapping engagement with the ear 82, and with each other, whereby rotation of the sleeve 50 relative to the shaft 32, in a direction to unwind the leash therefrom, will be prevented.

If it is desired to permit only a predetermined portion of the leash to be unwound, it is merely necessary to permit the dog to withdraw a portion of the leash from the sleeve 50 and then lock the toothed disk 42 against rotation by means of the rod 98, the spring 116 retaining the rod in its locking position. Further withdrawal of the leash from the sleeve 50 will then be prevented, but it will be appreciated that rewinding of the leash on the reel will result, as soon as the leash becomes slack.

From the foregoing, it is thought that the operation and construction of the device will be readily understood, and further discussion is therefore believed to be unnecessary. However, since numerous modifications will readily occur to those skilled in the art after a consideration of the foregoing specification and accompanying drawings, it is not intended to limit the invention to that shown and described, but all suitable modifications may be resorted to falling within the scope of the appended claims.

Having described the invention, what is claimed as new is:

1. A tape reel comprising a support, a shaft rotatably journaled on said support, a spool rotatably journaled on said shaft and a tape wound upon said spool, means yieldingly retracting said tape on said spool, a locking arm carried by said shaft for rotation therewith, means for selectively locking said shaft against rotation, an ear on said spool, means responsive to unwinding of said tape from said spool for unidirectionally locking said locking arm to said ear to prevent tape unwinding rotation of said spool.

2. The combination of claim 1 wherein said last-mentioned means includes a dog rotatably mounted on said shaft and disposed in the path of movement of said locking arm and ear.

3. The combination of claim 2 including spring means yieldingly urging said shaft to rotate in a direction to cause said locking arm and dog to yieldingly engage said ear whereby locking of said shaft against rotation will prevent unwinding of tape from said spool.

4. The combination of claim 3 wherein said spring means includes a coil spring disposed about said shaft and terminally secured to said support and said shaft.

5. The combination of claim 4 wherein said tape retracting means includes a coil spring disposed about said shaft and terminally secured to said spool and said support.

6. A tape reel comprising a housing, a shaft rotatably journaled in said housing, a handle forming member carried by said housing in parallel spaced relation thereto, a spool rotatably journaled on said shaft and a tape wound upon said spool, means yieldingly retracting said tape on said spool, a locking arm carried by said shaft, means unidirectionally locking said locking arm to said spool to prevent withdrawal of tape from said spool when said locking arm is locked against rotation, and means carried by said handle forming member for selectively locking said shaft against rotation.

7. A tape reel comprising a housing, a shaft rotatably journaled in said housing, a handle carried by said housing in parallel spaced relation thereto, a spool rotatably journaled on said shaft and a tape wound on said spool, means yieldingly retracting said tape on said spool, a locking arm carried by said shaft, means unidirectionally locking said locking arm to said spool when said rotation of said locking arm is restricted, and means carried by the handle for selectively braking and locking said shaft against rotation.

8. The combination of claim 7 including means yieldingly urging said shaft to rotate in a direction to cause the locking arm to be yieldingly connected to the spool whenever the shaft is free to rotate.

9. The combination of claim 7, wherein the means for selectively braking and locking the shaft against rotation include a first disc adapted to be locked against rotation, and a second disc adapted to be frictionally engaged by a brake shoe.

ANDREW P. HAYES.

References Cited in the file of this patent
UNITED STATES PATENTS

| Number | Name | Date |
|---|---|---|
| 1,904,000 | Hoyt | Apr. 18, 1933 |
| 1,956,938 | Wood et al. | May 1, 1934 |
| 2,217,323 | Sackett | Oct. 8, 1940 |
| 2,314,504 | Lifchultz | Mar. 23, 1943 |
| 2,485,385 | Komassa | Oct. 18, 1949 |